United States Patent
Bay et al.

(10) Patent No.: US 7,606,289 B2
(45) Date of Patent: Oct. 20, 2009

(54) OVERLAYING DIGITAL SIGNALS ON ANALOG WIRELESS COMMUNICATION SIGNALS

(75) Inventors: FM Bay, Sunnyvale, CA (US); Daniel J. Heil, Los Gatos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 634 days.

(21) Appl. No.: 11/194,033

(22) Filed: Jul. 29, 2005

(65) Prior Publication Data

US 2007/0025418 A1    Feb. 1, 2007

(51) Int. Cl.
  *H04B 1/00*    (2006.01)
(52) U.S. Cl. ........................................ 375/130
(58) Field of Classification Search ........ 375/130
  See application file for complete search history.

(56) References Cited

U.S. PATENT DOCUMENTS

| | | | | |
|---|---|---|---|---|
| 3,475,558 | A | 10/1969 | Cahn | 179/15 |
| 3,515,805 | A | 6/1970 | Fracassi et al. | 178/22 |
| 3,518,547 | A | 6/1970 | Filipowsky | 325/42 |
| RE27,202 | E * | 10/1971 | Kahn | 455/222 |
| 3,811,038 | A | 5/1974 | Reddaway | 235/152 |
| 4,241,447 | A | 12/1980 | Epstein | 375/1 |
| 4,406,009 | A | 9/1983 | Lender | 375/18 |
| 4,461,011 | A | 7/1984 | Lender et al. | 375/18 |
| 4,755,987 | A | 7/1988 | Lee et al. | 370/77 |
| 5,081,645 | A | 1/1992 | Resnikoff et al. | 375/1 |
| 5,949,793 | A | 9/1999 | Bossard et al. | |
| 6,426,977 | B1 | 7/2002 | Lee et al. | 375/259 |
| 6,452,977 | B1 | 9/2002 | Goldston et al. | |
| 6,741,636 | B1 | 5/2004 | Lender | 375/146 |
| 6,865,215 | B1 | 3/2005 | Russell et al. | |

OTHER PUBLICATIONS

Milstein, L.B.; Schilling, D.L.; Pickholtz, R.L.; Erceg, V.; Kullback, M.; Kanterakis, E.G.; Fishman, D.S.; Biederman, W.H.; Salerno, D.C.; "On the feasibility of a CDMA overlay for personal communications networks," IEEE Journal on Selected Areas in Communications, vol. 10, Issue 4, May 1992 pp. 655-668.*

(Continued)

*Primary Examiner*—David C Payne
*Assistant Examiner*—Nader Bolourchi
(74) *Attorney, Agent, or Firm*—Marsh Fischmann & Breyfogle LLP

(57) ABSTRACT

A method and system of providing digital communications over frequencies concurrently utilized for analog communications. In one embodiment, the method (400) includes the step of establishing (410) a digital channel including two or more analog channels that are concurrently used to provide analog communications. A spread spectrum digital waveform is generated (420) having its energy spread throughout the bandwidth of the digital channel. The spread spectrum digital waveform is modulated (430) to include information to be communicated digitally and transmitted (440) over the digital channel. The transmitted modulated spread spectrum digital waveform is received (450) and demodulated (460) to obtain the information.

24 Claims, 4 Drawing Sheets

OTHER PUBLICATIONS

Schilling, D.L.; Milstein, L.B.; Pickholtz, R.L.; Kullback, M.; Miller, F.; "A spectrally efficient CDMA overlay," Military Communications Conference, 1991. MILCOM '91, Conference Record, 'Military Communications in a Changing World'., IEEE, Nov. 4-7, 1991 pp. 1183-1185 vol. 3.*

Parsa, K.; Ghassemzadeh, S.; "B-CDMA overlay forward link and reverse link capacity based on random traffic and a new CDMA call blocking model;" IEEE Global Telecommunications Conference, 1995. Globecom '95., vol. 3, Nov. 13-17, 1995 pp. 2171-2176 vol. 3.*

Koorevaar, P.; Ruprecht, J.; "Frequency overlay of GSM and cellular B-CDMA" IEEE Transactions on Vehicular Technology, vol. 48, Issue 3, May 1999 pp. 696-707.*

International Search Report And The Written Opinion Of The International Searching Authority,Or The Declaration. International Application No. PCT/US06/23521. Mailing Date Apr. 30, 2007.

* cited by examiner

OVERLAYING DIGITAL SIGNALS ON ANALOG WIRELESS COMMUNICATION SIGNALS

FIELD OF THE INVENTION

The present invention relates generally to wireless communications, and more particularly to providing wireless digital communications without requiring exclusive spectrum.

BACKGROUND OF THE INVENTION

At present, communications between airborne vehicles and ground stations such as, for example, between airplanes and air traffic control centers, is generally provided over analog wireless very high frequency (VHF) broadcasts using 25 KHz bandwidth assignments (25 KHz analog channels). Public safety communication systems such as, for example, systems employed by emergency responders (e.g., police, fire, and emergency medical technicians) and their dispatchers also often employ similar analog communication channels over a variety of frequencies. Given the large number of analog channels assigned for such uses, a substantial amount of spectrum is occupied and underutilized.

Digital communication systems can provide enhanced capabilities as compared with existing analog air-to-ground/ground-to-air and public safety communication systems such as, for example, an ability to accommodate more system users and improved transmission clarity and enhanced information transmission capabilities. Thus, there may be a desire to replace such analog systems with digital systems, but due to associated costs and other constraints it may not be practical to promptly end the use of such analog communication systems and require that digital systems immediately be employed by all users within a geographic region (e.g., a national or international air traffic control corridor, an air traffic control area surrounding an airport, a county, or a city). Thus, an extensive transition period may be required wherein analog and digital communication capabilities coexist within a given geographic region while users migrate from analog to digital systems. However, identifying a sufficient block of available spectrum for such new digital communication systems may be difficult given the crowded nature of the spectrum, competing uses for available spectrum (e.g., cell phone operations, wireless networks, military applications), and the existence of such a large amount of spectrum that is already assigned to such users.

SUMMARY OF THE INVENTION

Accordingly, the present invention is directed to providing concurrent use of the same spectrum by both analog and digital communication systems. More particularly, the present invention provides for concurrent use in digital communications of spectrum that is already assigned for analog communications by overlaying digital communication signals on analog wireless signals. One advantage of the present invention is that blocks of unassigned spectrum need not be identified and utilized in order to migrate existing analog communication systems to digital communication systems. Another advantage provided by the present invention is that existing analog communication systems and new digital communication systems may coexist and be simultaneously supported within the same block(s) of spectrum, thus allowing the introduction of new services without retiring existing services.

In accordance with one aspect of the present invention, a method of providing digital communications over frequencies concurrently utilized for analog communications includes the step of establishing a digital channel including two or more analog channels that are concurrently used to provide analog communications. In this regard, the analog channels may, for example, be 25 KHz VHF channels assigned for use in providing, for example, air-to-ground/ground-to-air communications or public safety communications. Each analog channel is centered at a different frequency, and the selected digital channel has a bandwidth corresponding to the sum of the bandwidths of the analog channels included in the digital channel. In one embodiment of the method, there are at least ten contiguous analog channels included in the digital channel. Regardless of the number of analog channels, an even number of equal bandwidth analog channels may be desirable so that the center of the digital channel does not coincide with the center of one of the analog channels included in the digital channel. A spread spectrum digital waveform is generated having its energy spread throughout the bandwidth of the digital channel. The spread spectrum digital waveform is modulated to include information to be communicated digitally, and the modulated spread spectrum digital waveform is transmitted over the digital channel.

The method of the present invention also contemplates the transmission of information over multiple digital channels. In this regard, the method of the present invention may further include establishing one or more additional digital channels. Each additional digital channel that is established includes two or more analog channels that are concurrently used to provide analog communications, with at least one of the analog channels included in each additional digital channel having a bandwidth and being centered at a different frequency from the analog channels included in the previously established digital channel or the other additional channels. It is also possible for each of the analog channels included in the additional digital channels to be centered at different frequencies from one another and from the analog channels included in the previously established digital channel and the other additional channels. One or more additional spread spectrum digital waveforms corresponding with each additional digital channel are generated. Each additional spread spectrum digital waveform has its energy spread throughout the bandwidth of its corresponding additional digital channel. The additional spread spectrum digital waveforms are modulated to include information to be communicated digitally, and the additional modulated spread spectrum digital waveforms are transmitted over their respective corresponding additional digital channels. In this regard, different information may be transmitted on the digital channels, or the same information may be transmitted on two or more of the digital channels in order to provide redundant communications.

According to another aspect of the present invention, a system operable to provide digital communications over frequencies concurrently utilized for analog communications includes one or more transmitters and one or more receivers. Each transmitter is operable to select a digital channel including at least two analog channels concurrently used to provide analog communications. In this regard, the analog channels may, for example, be 25 KHz VHF channels assigned for use in providing, for example, air-to-ground/ground-to-air communications or public safety communications. Each analog channel is centered at a different frequency, and the selected digital channel has a bandwidth corresponding to the sum of the bandwidths of the analog channels included in the digital channel. In one embodiment of the system, there are at least ten contiguous analog channels included in the digital channel. Regardless of the number of analog channels, an even number of equal bandwidth analog channels may be desirable so that the center of the digital channel does not coincide with the center of one of the analog channels included in the digital channel. Each transmitter is further operable to generate a spread spectrum digital waveform such that the energy of the spread spectrum digital waveform is spread throughout the bandwidth of the digital channel. Each transmitter is also operable to modulate the spread spectrum digital waveform to include information to be communicated digitally and is also operable to transmit the modulated spread spectrum digital waveform over the digital channel. Each receiver is tunable to the digital channel and operable to demodulate the modulated spread spectrum digital waveform to obtain the information therefrom.

The system of the present invention may also transmit and receive information on more than one digital channel. In this regard, where there are multiple transmitters and receivers, each transmitter may select a different digital channel comprised of a different set of concurrently used analog channels, and each receiver may be tuned to a different digital channel. Also, regardless of whether there are multiple transmitters and receivers, each transmitter may be enabled to also select one or more additional digital channels and each receiver may be tunable to one or more of the additional digital channels. The additional digital channels include at least two analog channels concurrently used to provide analog communications, with at least one of the analog channels included in each additional digital channel being centered at a different frequency from the analog channels included in the previously selected digital channel and the other additional digital channels. It is also possible for each of the analog channels included in the additional digital channels to be centered at different frequencies from one another and from the analog channels included in the previously selected digital channel.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
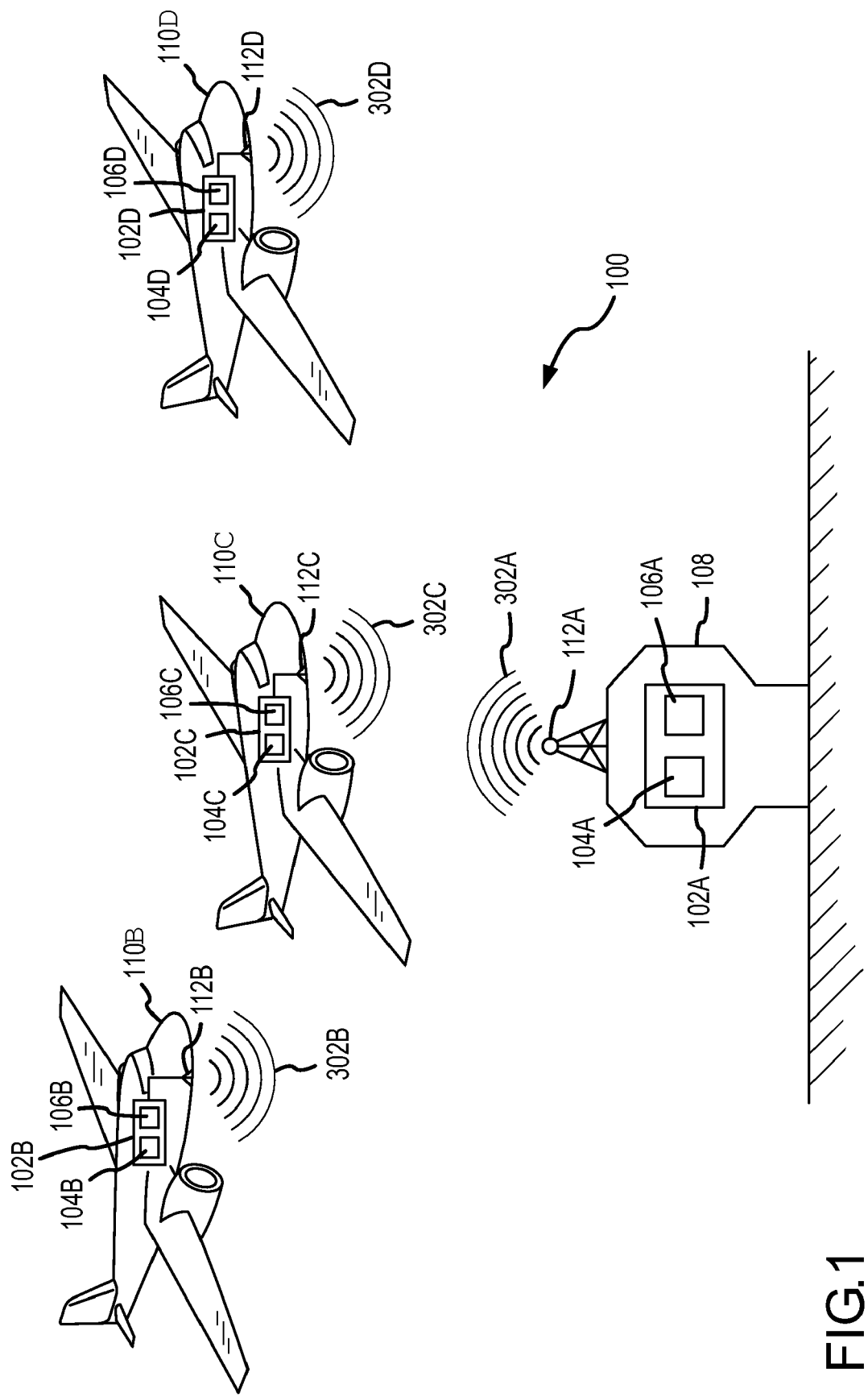
FIG. 1 is a schematic representation of one embodiment of a digital communication system in accordance with the present invention wherein the system is shown providing digital communication between airplanes and a ground control station.

FIG. 1 shows one embodiment of a system 100 that provides digital communications over concurrently utilized analog communication channels. The system 100 permits digital communications without the need for clearing the spectrum of any analog communications over the same frequencies.

The system 100 includes several digital transceivers 102A, 102B, 102C, 102D with each transceiver 102A, 102B, 102C, 102D having transmitter 104A, 104B, 104C, 104D and receiver 106A, 106B, 106C, 106D portions. As illustrated, the system 100 may be utilized to provide digital air-to-ground and ground-to-air communications between a ground controller station 108 and multiple airplanes 110B, 110C, 110D. However, application of the system 100 is not limited to air-to-ground or ground-to-air communications and may be utilized in any situation where concurrent digital communications are desired over a number of analog channels previously assigned for analog communications such as, for example, public safety (e.g., police, fire, and emergency medical) communications.

System 100 provides bi-directional (two-way) digital communications between the ground controller station 108 and the airplanes 110B, 110C, 110D, but where bi-directional communications are not needed, the system 100 can be simplified by including only a transmitter (e.g. at the ground controller station 108) and multiple receivers (e.g., in the airplanes) 110B, 110C, 110D) or vice versa. Furthermore, the system can be simplified if only one of the transceivers (e.g., at the ground controller station 108) is enabled for simultaneous digital communications over multiple digital channels whereas other transceivers (e.g., on the airplanes 110B, 110C, 110D) are enabled for digital communications over only a single digital channel at a time. Additionally, other embodiments of the system may include as few as two transceivers or many more than the four transceivers illustrated in FIG. 1, including multiple ground based transceivers.

Figure 2:
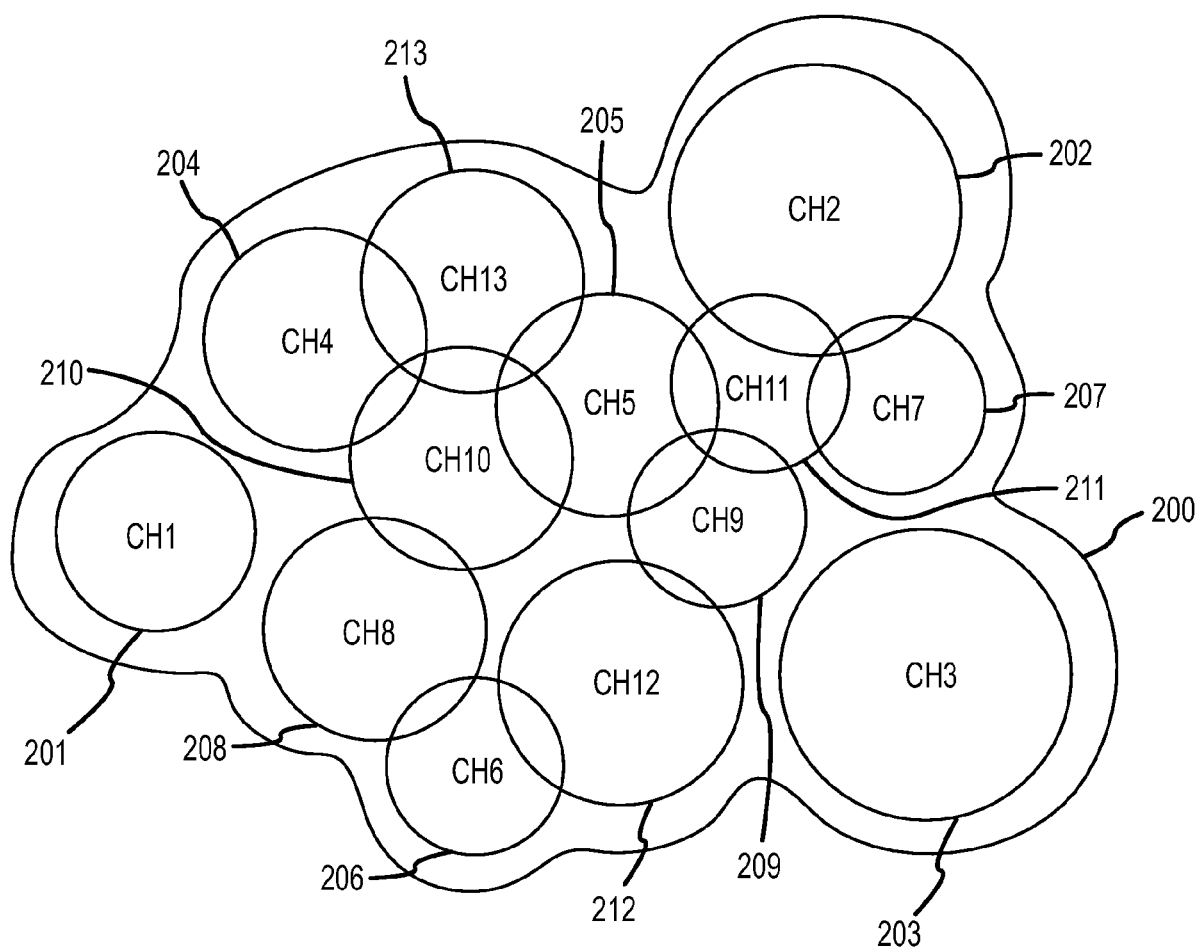
FIG. 2 is schematic representation of an exemplary geographic region with exemplary coverage areas of a plurality analog communication channels over which digital communications may concurrently be provided in accordance with the present invention.

Referring to FIG. 2, there is shown a schematic representation of an exemplary geographic arrangement of analog communication channels that may provide analog communications between, for example, ground control stations and airplanes within a particular geographic region 200. In FIG. 2, the circles represent respective portions of the geographic region 200 covered by a ground control station or the like that has been assigned a particular analog communication channel CH1-CH13. An airplane flying within the coverage area (e.g., circle 201) of a particular ground control station communicates with the ground control station using the assigned analog channel (e.g., CH1). In the illustrated embodiment, there are thirteen channels CH1-CH13 shown. However, in other embodiments there may be fewer or more analog channels assigned within a particular geographic region. As illustrated, non-adjacent channels CH1-CH13 may be assigned to overlapping coverage areas 201-213 in order to reduce the possibility of interference. Although not shown, it is also possible that one or more of the coverage areas 201-213 may have multiple analog communication channels assigned thereto.

Figure 3:
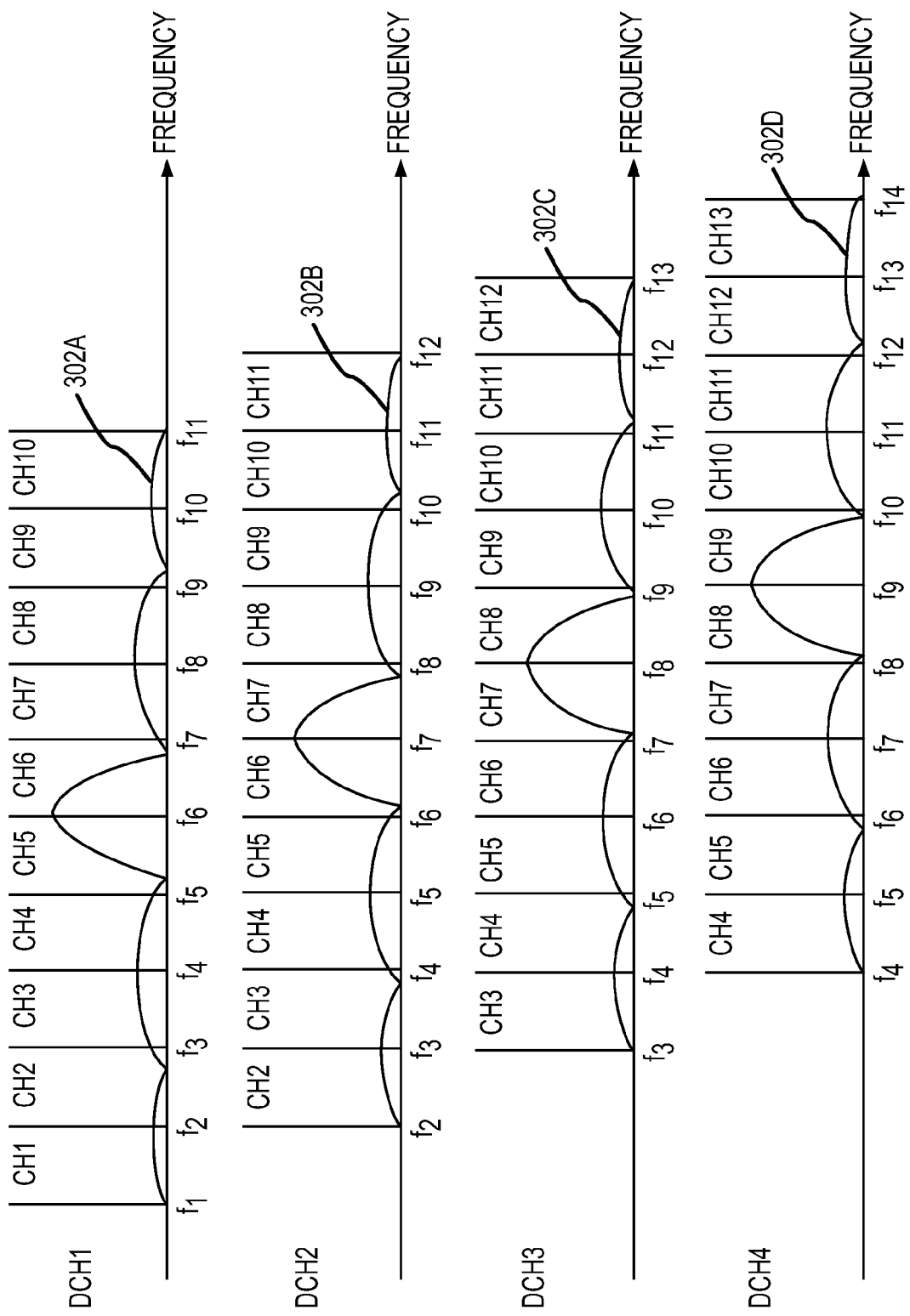
FIG. 3 is a plot showing exemplary digital channels comprised of a number of the analog channels shown in FIG. 2, with exemplary spread spectrum digital waveforms on each channel in accordance with the present invention.

Referring to FIG. 3, each of the thirteen analog channels CH1-CH13 assigned to the geographic region 200 depicted in FIG. 2 is centered at a different frequency and has a bandwidth associated therewith. In this regard, the first analog channel CH1 has a bandwidth of $(f_2-f_1)$ and a center frequency of $(f_1+(f_2-f_1)/2)$, the second analog channel CH2 has a bandwidth of $(f_3-f_2)$ and a center frequency of $(f_2+(f_3-f_2)/2)$, the third analog channel CH3 has a bandwidth of $(f_4-f_3)$ and a center frequency of $(f_3+(f_4-f_3)/2)$, and so on. In one embodiment, the center frequencies of the analog channels CH1-CH13 are in the very high frequency (VHF) portion of the electromagnetic spectrum (e.g. from 30 MHz to 300 MHz) with each analog channel having a 25 KHz bandwidth. Thus, the thirteen analog channels CH1-CH13 depicted occupy a continuous 325 KHz band of the electromagnetic spectrum from $f_1$ through $f_{14}$.

A system 100 such as illustrated in FIG. 1 provides digital communications without requiring that a block of the electromagnetic spectrum be cleared of existing analog use or that an unassigned block of the electromagnetic spectrum be assigned for exclusive digital communications use. In this regard, the system 100 utilizes digital channels comprised of existing previously assigned analog communication channels. As shown in FIG. 3, there may, for example, be four digital channels DCH1-DCH4 established using the thirteen analog channels CH1-CH13 shown in FIG. 2, with each digital channel having a bandwidth corresponding to ten of the analog channels CH1-CH13. The first digital channel DCH1 comprises contiguous analog channels CH1 through CH10, the second digital channel DCH2 comprises contiguous analog channels CH2 through CH11, the third digital channel DCH3 comprises contiguous analog channels CH3 through CH12, and the fourth digital channel DCH4 comprises contiguous analog channels CH4 through CH13. The first digital channel DCH1 has a bandwidth of $(f_{11}-f_1)$ and a center frequency of $(f_1+(f_{11}-f_1)/2)$, the second digital channel DCH2 has a bandwidth of $(f_{12}-f_2)$ and a center frequency of $(f_2+(f_{12}-f_2)/2)$, the third digital channel DCH3 has a bandwidth of $(f_{13}-f_3)$ and a center frequency of $(f_3+(f_{13}-f_3)/2)$, and the fourth digital channel DCH4 has a bandwidth of $(f_{14}-f_4)$ and a center frequency of $(f_4+(f_{14}-f_4)/2)$. Thus, where each of the analog channels CH1-CH13 has a bandwidth of 25 KHz, each of the digital channels DCH1-DCH4 has a bandwidth of 250 KHz.

Although the four digital channels DCH1-DCH4 illustrated share a number of analog channels in common (e.g., all four digital channels DCH1-DCH4 include analog channels CH4 through CH10), in other embodiments the digital channels need not utilize overlapping analog channels. For example, where there are forty analog channels available, a first digital channel may utilize analog channels 1-10, a second digital channel may utilize analog channels 11-20, a third digital channel may utilize analog channels 21-30, and a fourth digital channel may utilize analog channels 31-40. However, using overlapping channels permits a greater number of digital channels to be established for a given number of analog channels (e.g., 31 digital channels may be established using 40 analog channels when the digital channels are established as shown in FIG. 3). In other embodiments, each digital channel need not utilize the same number of analog channels. However, regardless of the number of analog channels comprising a digital channel, each digital channel preferably utilizes an even number of analog channels so that its center frequency does not coincide with the center frequency of one of the analog channels.

Referring again to FIG. 1, in order to provide digital communications between the airplanes 110B, 110C, 110D and the ground controller station 108, each of the transmitters 104B-104D of the transceivers 102B-102D onboard the airplanes 110B, 110C, 110D is operable to select a digital channel comprised of two or more analog channels (e.g., one of the digital channels DCH1-DCH4 of FIG. 3), and the receiver 106A of the transceiver 102A in the ground controller station 108 is tunable to each of the digital channels selected by the transmitters 104B-104D. Likewise, the transmitter 104A of the transceiver 102A in the ground controller station 108 is operable to select a digital channel comprised of two or more analog channels (e.g., one of the digital channels DCH1-DCH4 of FIG. 3), and the receivers 106B-106D of the transceivers 102B-102D in the airplanes 110B, 110C, 110D are tunable to the digital channel selected by the ground control station 108 transmitter 104A. In the present embodiment, each transmitter 104A-104D of the transceivers 102A-102D selects a different digital channel. However, in other embodiments, two or more of the transmitters 104A-104D may select the same digital channel. Also, in other embodiments, each of the transmitters 104A-104D may be fixed to operate on a particular digital channel.

Regardless of the digital channel selected by a particular transmitter 104A-104D, each of the transmitters 104A-104D generates a spread spectrum digital waveform wherein energy of the spread spectrum digital waveform is spread throughout the bandwidth of the digital channel. FIG. 3 shows power spectrums of exemplary spread spectrum digital waveforms 302A-302D for each of the exemplary digital channels DCH1-DCH4. As can be seen in FIG. 3, the power of each spread spectrum digital waveform 302A-302D is spread over the entire bandwidth of its corresponding digital channel DCH1-DCH4. By spreading the power of the digital waveforms 302A-302D over a number of analog channels (e.g., over 250 KHz), the digital waveform causes only minimal, if any, interference with existing analog communications which have their power concentrated within much smaller bandwidths (e.g., 25 KHz). Also, since each digital channel DCH1-DCH4 is comprised of an even number (e.g., 10) of analog channels, the power of the spread spectrum digital waveforms 302A-302D is greatest in the nulls between adjacent analog channels (e.g., at $f_6$, $f_7$, $f_8$, and $f_9$).

The transmitters 104A-104D modulate the spread spectrum digital waveforms 302A-302D to include information to be communicated digitally and transmit the modulated spread spectrum digital waveforms 302A-302D over their respective digital channels DCH1-DCH4. For example, voice instructions from an air traffic controller working in the ground control station 108 may be modulated onto spread spectrum digital waveform 302A by the transmitter 104A portion of the transceiver 102A in the ground control station 108 and transmitted over digital channel DCH1 from an antenna 112A coupled to the transceiver 102A. Likewise, voice responses from pilots flying the airplanes 110B, 110C, 110D may be modulated onto respective spread spectrum digital waveforms 302B-302D by the transmitters 104B-104D of the transceivers 102B-102D in the airplanes 110B, 110C, 110D and transmitted over respective digital channels DCH2-DCH4 from antennas 112B-112D coupled to the transceivers 102B-102B. As may be appreciated, any type of information may be modulated onto the spread spectrum digital waveforms 302A-302D by the transmitters 104A-104D in addition to voice information such as, for example, information relating to the altitude, airspeed, and other operating conditions (e.g., black box information) of the airplanes 110B, 110C, 110D, automated location transponder or runway landing guidance information, or even voice, video or data transmissions directed to or from passengers onboard the airplanes 110B, 110C, 110D by additional systems coupled to the transceivers 102A-102D.

The receivers 106A-106D may be tuned to the digital channels DCH1-DCH4 and operate to demodulate the modulated spread spectrum digital waveforms 302A-302D directed to the transceivers 102A-102B by the antennas 112A-112D to which they are coupled. In this regard, the antennas 112A-112D may include separate transmission and reception elements. By way of example, the receivers 106B-106D of the transceivers 102B-102D in the airplanes 110B 110C, 110D may be tuned to digital channel DCH1 in order to demodulate the modulated digital spread spectrum waveform 302A from the ground control station 108 to obtain the voice instructions from the air traffic controller. Likewise, the receiver 106A in the transceiver 102A in the ground control station 108 may be tuned to any one of digital channels DCH2-DCH4 in order to demodulate the spread spectrum digital waveforms 302B-302D to obtain the voice responses from the pilots flying the airplanes 110B, 110C, 110D.

In accordance with the present embodiment, one or more of the transmitters 104A-106D (e.g., transmitter 104A in the transceiver 102A in the ground control station 108) may be configured to simultaneously modulate multiple digital channels in order to accommodate simultaneous transmission of information on multiple digital channels, whereas one or more of the transmitters 104A-104D (e.g., the transmitters 104B-104D in the transceivers 102B-102D onboard the airplanes 110B, 110C, 110D) may be configured to modulate and transmit over a single digital channel at a time in order to reduce to complexity and cost of such transmitters. Similarly, one or more of the receivers 106A-106D (e.g., receiver 106A in the transceiver 102A in the ground control station 108) may be configured to simultaneously tune and demodulate multiple digital channels in order to accommodate simultaneous reception of information on multiple digital channels, whereas one or more of the receivers 106A-106D (e.g., the receivers 106B-106D in the transceivers 102B-102D onboard the airplanes 110B, 110C, 110D) may be configured to only tune and demodulate a single digital channel at a time in order to reduce to complexity and cost of such receivers.

Figure 4:
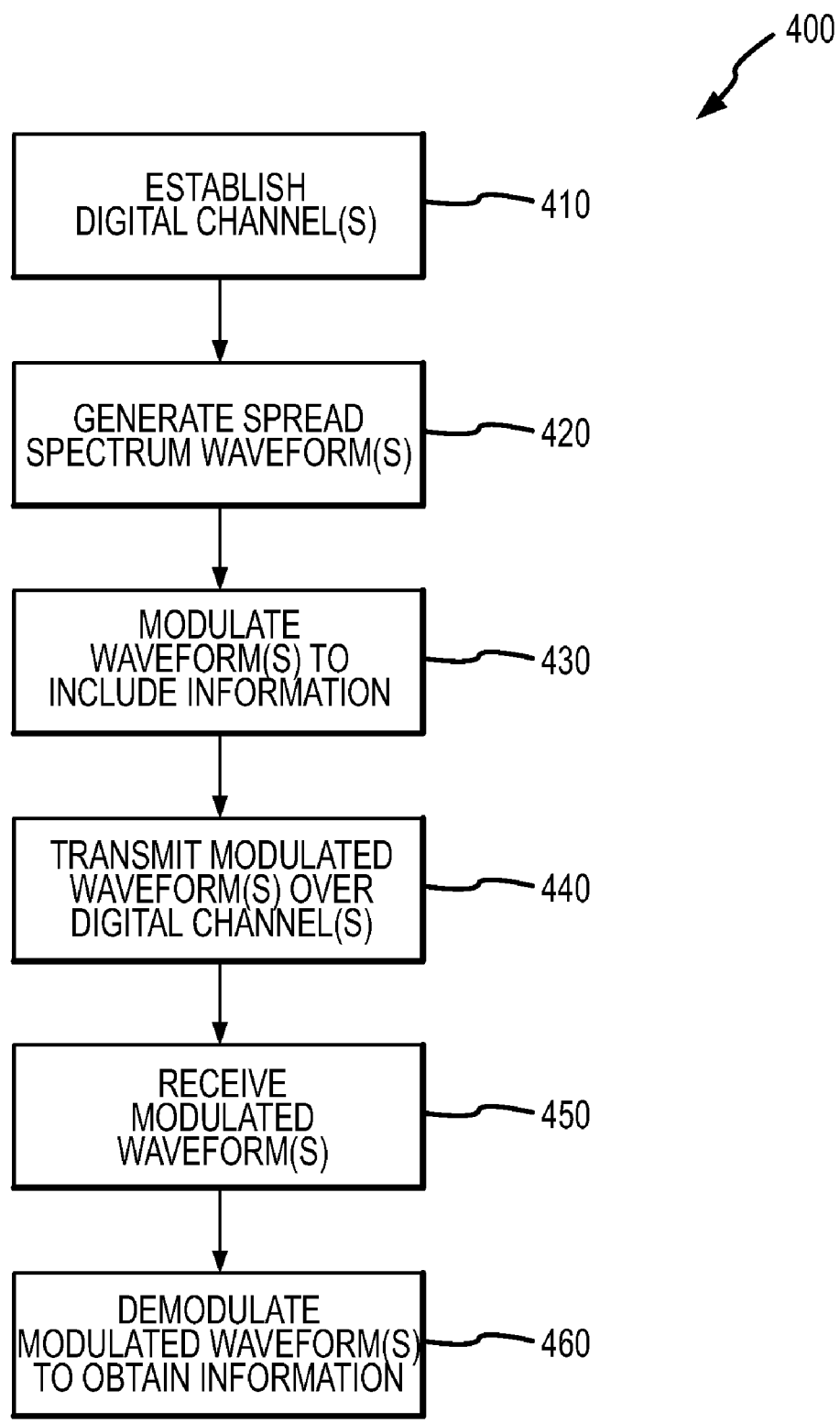
FIG. 4 is a flow chart showing one embodiment of a method of providing digital communications over spectrum concurrently utilized for analog communications in accordance with the present invention.

Referring now to FIG. 4, the steps involved in one embodiment of a method (400) of providing digital communications over frequencies concurrently utilized for analog communications are illustrated. The method (400) shown in FIG. 4 may be implemented using, for example, a system 100 such as shown in FIG. 1. The method (400) involves establishing (410) one or more a digital channels. Each digital channel includes two or more analog channels that are concurrently used to provide analog communications (e.g., air-to-ground or ground-to-air VHF channels). Each analog channel within a particular digital channel is centered at a different frequency, and each digital channel has a bandwidth corresponding to the sum of the bandwidths of the analog channels included in the digital channel. Preferably, each digital channel includes at least ten contiguous analog channels. Additionally, although it is possible for each digital channel to include only analog channels that are not included in any other digital channel, preferably, each digital channel shares a number of analog channels with one or more other digital channels in order to increase the number of digital channels available within a given number of analog channels.

After establishing (410) one or more digital channels, spread spectrum digital waveforms are generated (420) for each of the selected digital channels. The energy of the spread spectrum digital waveforms is spread throughout the bandwidth of their respective digital channels. Additionally, there is preferably an even number of contiguous analog channels included in each digital channel, with each analog channel having the same bandwidth so that the spread spectrum digital waveforms are centered at the boundary between two adjacent analog channels (in the null between adjacent analog channels).

The spread spectrum digital waveforms are modulated (430) to include information to be communicated digitally. In this regard, the spread spectrum digital waveforms may be modulated using appropriate digital modulation techniques to digitally encode the information. In this regard, the spread spectrum digital waveforms may, for example, be modulated in accordance with spread spectrum techniques described in U.S. Pat. No. 6,741,636 entitled "SYSTEM AND METHOD FOR CONVERTING DATA INTO A NOISE-LIKE WAVEFORM", or in accordance with well known code division multiple access (CDMA) techniques. The information modulated into each spread spectrum digital waveform may be different information, or two or more of the waveforms may be modulated to include the same information in order to provide redundant communications.

The modulated spread spectrum digital waveforms are then transmitted (440) over their respective digital channels. The modulated spread spectrum digital waveforms may then be received (450) and demodulated (460) to obtain the information therefrom. Thus, in accordance with the method (400) information may be communicated digitally between, for example, airplanes and ground controllers, or for example, emergency responders and dispatchers, using the same analog channels already assigned for such communication.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method of providing digital communications over frequencies concurrently utilized for analog communications, said method comprising the steps of:
    establishing a digital channel including at least two contiguous analog channels concurrently used to provide analog communications, each analog channel being centered at a different frequency and having a bandwidth, the digital channel having a bandwidth corresponding to the sum of the bandwidths of the analog channels included in the digital channel, wherein an even number of analog channels are included in the digital channel whereby a center frequency of the digital channel does not coincide with center frequencies of any of the analog channels included in the digital channel;
    generating a spread spectrum digital waveform wherein energy of the spread spectrum digital waveform is spread throughout the bandwidth of the digital channel;
    modulating the spread spectrum digital waveform to include information to be communicated digitally; and
    transmitting the modulated spread spectrum digital waveform over the digital channel.

2. The method of claim 1 wherein the bandwidth of each analog channel is the same.

3. The method of claim 1 wherein the analog channels comprise VHF channels.

4. The method of claim 3 wherein the analog channels are concurrently used in providing air-to-ground/ground-to-air communications.

5. The method of claim 3 wherein the analog channels are concurrently used in providing public safety communications.

6. The method of claim 1 wherein the digital channel includes at least ten analog channels.

7. The method of claim 1 further comprising:
    establishing at least one additional digital channel including at least two analog channels concurrently used to provide analog communications, at least one of the analog channels included in the at least one additional digital channel being centered at a different frequency from the analog channels included in the previously established digital channel, the at least one additional digital channel having a bandwidth corresponding to the sum of bandwidths of the analog channels included in the at least one additional digital channel;

generating at least one additional spread spectrum digital waveform wherein energy of the spread spectrum digital waveform is spread throughout the bandwidth of the at least one additional digital channel;

modulating the at least one additional spread spectrum digital waveform to include information to be communicated digitally; and transmitting the at least one modulated additional spread spectrum digital waveform over the at least one additional digital channel.

8. The method of claim 7 wherein each of the analog channels included in the at least one additional digital channel is centered at a different frequency from the analog channels included in the previously established digital channel.

9. A system operable to provide digital communications over frequencies concurrently utilized for analog communications, said system comprising:
at least one transmitter operable to select a digital channel including at least two contiguous analog channels concurrently used to provide analog communications, each analog channel being centered at a different frequency and having a bandwidth, the selected digital channel having a bandwidth corresponding to the sum of the bandwidths of the analog channels included in the digital channel, wherein an even number of analog channels are included in the digital channel whereby a center frequency of the digital channel does not coincide with center frequencies of any of the analog channels included in the digital channel, and wherein the at least one transmitter is further operable to generate a spread spectrum digital waveform wherein energy of the spread spectrum digital waveform is spread throughout the bandwidth of the digital channel, modulate the spread spectrum digital waveform to include information to be communicated digitally, and transmit the modulated spread spectrum digital waveform over the digital channel; and
at least one receiver tunable to the digital channel and operable to demodulate the modulated spread spectrum digital waveform to obtain the information therefrom.

10. The system of claim 9 wherein the bandwidth of each analog channel is the same.

11. The system of claim 9 wherein the analog channels comprise VHF channels.

12. The system of claim 11 wherein the analog channels are concurrently used in providing air-to-ground/ground-to-air communications.

13. The system of claim 11 wherein the analog channels are concurrently used in providing public safety communications.

14. The system of claim 9 wherein the digital channel includes at least ten analog channels.

15. The system of claim 9 wherein the at least one transmitter is further operable to select at least one additional digital channel including at least two analog channels concurrently used to provide analog communications, at least one of the analog channels included in the at least one additional digital channel being centered at a different frequency from the analog channels included in the previously selected digital channel, the at least one additional digital channel having a bandwidth corresponding to the sum of bandwidths of the analog channels included in the at least one additional digital channel, and wherein the at least one transmitter is further operable to generate at least one additional spread spectrum digital waveform wherein energy of the at least one additional spread spectrum digital waveform is spread throughout the bandwidth of the at least one additional digital channel, modulate the at least one additional spread spectrum digital waveform to include information to be communicated digitally, and transmit the at least one modulated additional spread spectrum digital waveform over the at least one additional digital channel; and wherein
the at least one receiver is further tunable to the at least one additional digital channel and operable to demodulate the at least one modulated additional spread spectrum digital waveform to obtain the information therefrom.

16. The system of claim 15 wherein each of the analog channels included in the at least one additional digital channel is centered at a different frequency from the analog channels included in the previously established digital channel.

17. An apparatus for providing digital communications over frequencies concurrently utilized for analog communications, said apparatus comprising:
means for selecting a digital channel including at least two contiguous analog channels concurrently used to provide analog communications, each analog channel being centered at a different frequency and having a bandwidth, the digital channel having a bandwidth corresponding to the sum of the bandwidths of the analog channels included in the digital channel, wherein an even number of analog channels are included in the digital channel whereby a center frequency of the digital channel does not coincide with center frequencies of any of the analog channels included in the digital channel;
means for generating a spread spectrum digital waveform wherein energy of the spread spectrum digital waveform is spread throughout the bandwidth of the digital channel;
means for modulating the spread spectrum digital waveform to include information to be communicated digitally;
means for transmitting the modulated spread spectrum digital waveform over the digital channel; and
means for receiving the modulated spread spectrum digital waveform on the digital channel and demodulating the modulated spread spectrum digital waveform to obtain the information therefrom.

18. The apparatus of claim 17 wherein the bandwidth of each analog channel is the same.

19. The apparatus of claim 17 wherein the analog channels comprise VHF channels.

20. The apparatus of claim 19 wherein the analog channels are concurrently used in providing air-to-ground/ground-to-air communications.

21. The apparatus of claim 19 wherein the analog channels are concurrently used in providing public safety communications.

22. The apparatus of claim 17 wherein the digital channel includes at least ten analog channels.

23. The apparatus of claim 17 further comprising:
means for selecting at least one additional digital channel including at least two analog channels concurrently used to provide analog communications, at least one of the analog channels included in the at least one additional digital channel being centered at a different frequency from the analog channels included in the previously selected digital channel, the at least one additional digital channel having a bandwidth corresponding to the sum of bandwidths of the analog channels included in the at least one additional digital channel;

means for generating at least one additional spread spectrum digital waveform wherein energy of the spread spectrum digital waveform is spread throughout the bandwidth of the at least one additional digital channel;

means for modulating the at least one additional spread spectrum digital waveform to include information to be communicated digitally;

means for transmitting the at least one modulated additional spread spectrum digital waveform over the at least one additional digital channel; and means for receiving the at least one modulated additional spread spectrum digital waveform on the at least one additional digital channel and demodulating the at least one modulated additional spread spectrum digital waveform to obtain the information therefrom.

24. The apparatus of claim 23 wherein each of the analog channels included in the at least one additional digital channel is centered at a different frequency from the analog channels included in the previously established digital channel.

* * * * *

UNITED STATES PATENT AND TRADEMARK OFFICE
CERTIFICATE OF CORRECTION

PATENT NO. : 7,606,289 B2  Page 1 of 1
APPLICATION NO. : 11/194033
DATED : October 20, 2009
INVENTOR(S) : Bay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Fourteenth Day of December, 2010

David J. Kappos
*Director of the United States Patent and Trademark Office*